United States Patent [19]

Kristola et al.

[11] Patent Number: 5,012,915
[45] Date of Patent: May 7, 1991

[54] METHOD AND APPARATUS FOR ROTATING AN ITEM

[75] Inventors: Jay L. Kristola, Kiel; John Préttie, Plymouth, both of Wis.

[73] Assignee: H.G. Weber & Co., Inc., Kiel, Wis.

[21] Appl. No.: 480,259

[22] Filed: Feb. 15, 1990

[51] Int. Cl.$^5$ .................................... B65G 47/24
[52] U.S. Cl. ........................... 198/411; 198/412; 198/416; 271/185
[58] Field of Search ............... 198/411, 412, 413, 415, 198/416, 604, 787, 624; 271/184, 185, 225, 251

[56] References Cited

U.S. PATENT DOCUMENTS

| | | |
|---|---|---|
| 1,567,909 | 12/1925 | Broadmeyer . |
| 2,407,174 | 9/1946 | Oberender . |
| 2,580,469 | 1/1952 | Schwartz . |
| 2,951,408 | 9/1960 | Novick . |
| 3,173,346 | 3/1965 | Zernov et al. . |
| 3,279,290 | 10/1966 | Stemmler . |
| 3,360,099 | 12/1967 | Barr . |
| 3,462,001 | 8/1969 | Boyce . |
| 3,605,980 | 9/1971 | Donahue et al. . |
| 3,758,104 | 9/1973 | Daily .................. 198/415 X |
| 4,155,440 | 5/1979 | Bogdanski . |
| 4,192,495 | 3/1980 | Heinzelmann et al. ......... 271/185 X |
| 4,371,157 | 2/1983 | Hunt et al. .................. 271/185 X |
| 4,482,147 | 11/1984 | Hibi et al. .................. 271/185 X |
| 4,561,819 | 12/1985 | Wiernicki . |
| 4,699,262 | 10/1987 | Nakano et al. .................. 198/411 |

FOREIGN PATENT DOCUMENTS

| | | | |
|---|---|---|---|
| 0033261 | 3/1977 | Japan .................. | 198/411 |
| 0258037 | 12/1985 | Japan .................. | 271/185 |
| 0201753 | 9/1987 | Japan .................. | 271/185 |
| 0244847 | 10/1987 | Japan .................. | 271/185 |
| 0587051 | 1/1978 | U.S.S.R. .................. | 198/415 |
| 2186252 | 8/1987 | United Kingdom .................. | 198/415 |

Primary Examiner—Robert P. Olszewski
Assistant Examiner—James R. Bidwell
Attorney, Agent, or Firm—Hill, Van Santen, Steadman & Simpson

[57] ABSTRACT

A device and method for positively controlling and rotating an item through a predetermined angle in a plane as said item is moved longitudinally in the plane. Different lateral portions of the item are moved at different speeds in the longitudinal direction to effect the rotation. Preferably a pair of cone shaped rollers are utilized which have a nip formed therebetween, coplanar with the plane of rotation. Alternatively a pair of spaced rollers having different linear surface speeds can be used to move the spaced lateral portions of the item at the different linear speeds. Positive control of the item is provided by opposed rotating members such as opposed belt conveyors or opposed sets of rollers and a mechanism is provided to selectively engage or release the opposed rotating members as required by the rotation of the item.

23 Claims, 4 Drawing Sheets

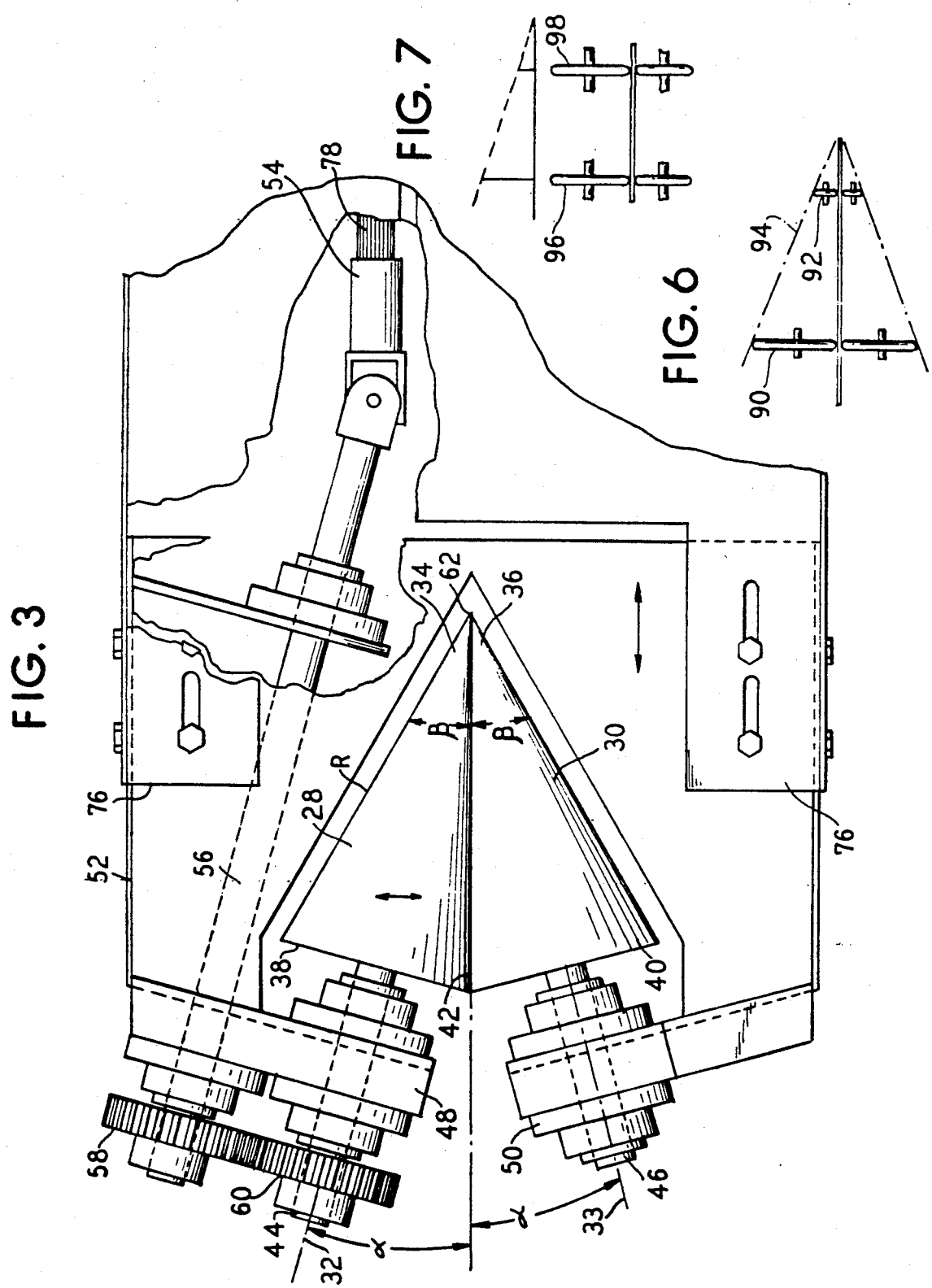

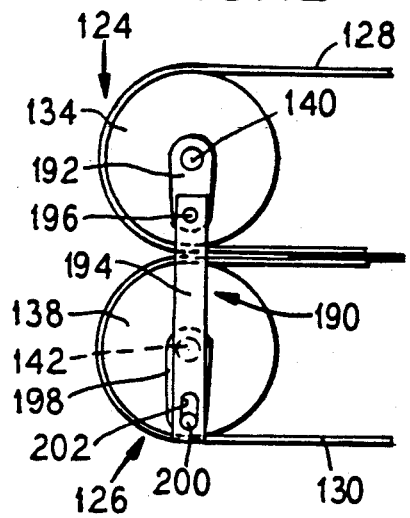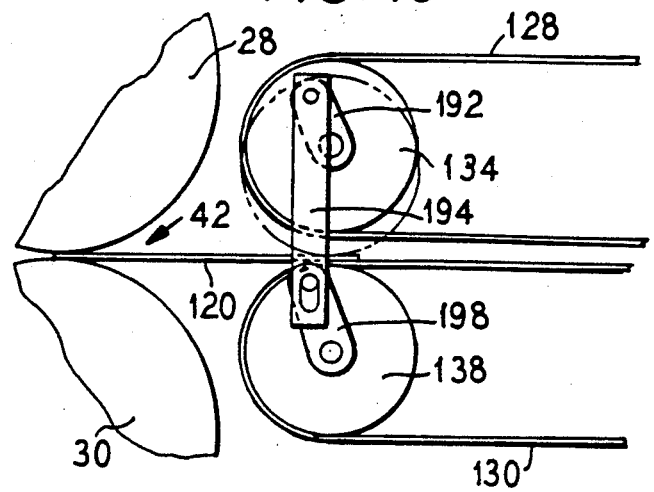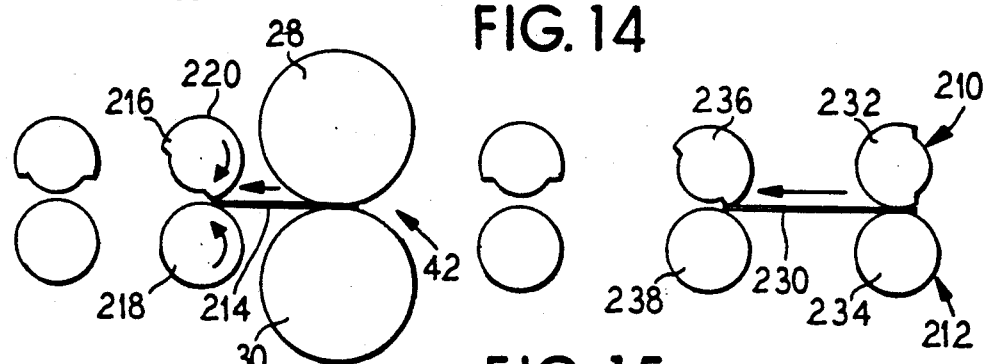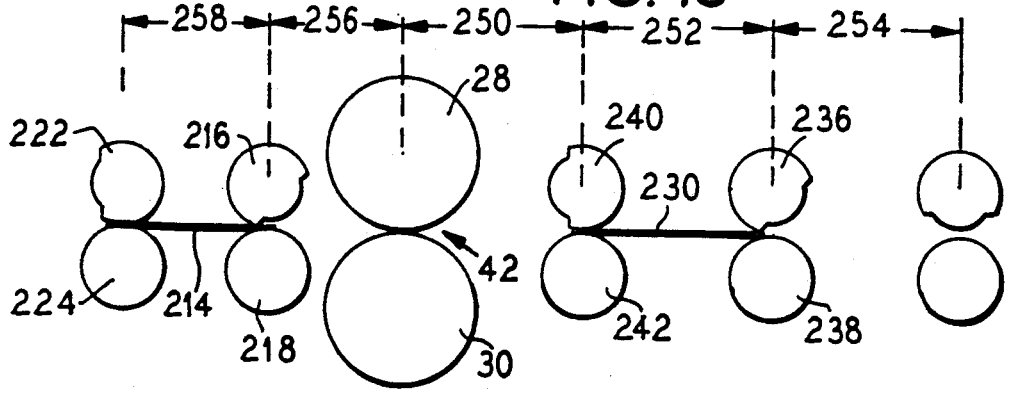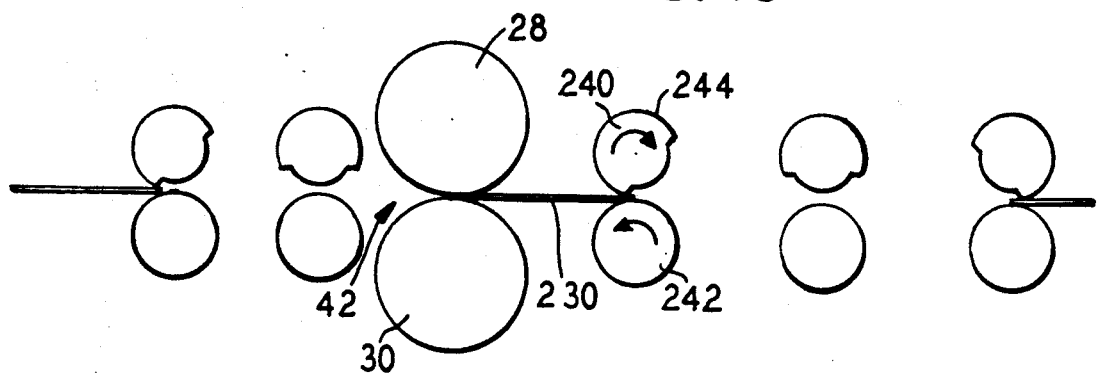

METHOD AND APPARATUS FOR ROTATING AN ITEM

BACKGROUND OF THE INVENTION

The present invention relates to a method and apparatus for rotating an item and more particularly for rotating an item as it travels along a conveying path and positively controlling the item before and after it is rotated.

In the bag manufacturing field, an environment in which the present invention is particularly useful, a web of bag material is successively folded, glued or bonded and cut in multiple steps and in varying orders of those steps, in order to produce a series of individual finished bags from the continuous web. In the process of forming the bag, the web of material is conveyed along a longitudinal path during which time certain folding, gluing and cutting steps are performed and then, in some situations, the bag is then conveyed along a transverse path to perform additional folding, gluing and perhaps cutting steps, on an edge perpendicular to edges engaged or acted upon during the initial steps, particularly when forming a flat bottom bag or heat sealed bottom bag. This results in a manufacturing line having a 90° bend therein to accommodate the change of direction of the bag material as it is being processed. Such a manufacturing line configuration results in an inefficient use of floor space within the manufacturing facility in order to accommodate the 90° bend in the assembly line.

It would be advantageous if there were provided a means for rotating the severed bag material as it moves longitudinally along the line in order to allow edge finishing operations to occur on two adjacent edges that extend at 90° to each other. It is also important to positively control the bag material as it travels along its path to ensure precise orientation of the material for the various operations.

SUMMARY OF THE INVENTION

The present invention provides an arrangement for rotating a bag, or any other article, as it is conveyed in a longitudinal direction and for positively controlling the bag, or other article, both prior to and subsequent to rotation such that precise orientation of the article will be maintained. The angle of rotation, while being described specifically herein as 90°, may be any selected angle by implementing the principles disclosed herein.

In a preferred embodiment of the invention, a pair of opposed cone shaped rollers forming a nip therebetween are provided in the conveying path, the angle of the cone being predetermined to result in a desired angle of rotation of the item passing through the nip between the cones. The cones may have a solid surface along their length or, the cones could be discontinuous along their length.

The cones provide a turning force on the item passing through their nip in that the larger or wider end of the cone has a higher linear surface speed than the smaller or vertex end, thus causing one part of the item to be moved faster than the other part, thereby resulting in rotation of the object as it passes through the nip. Through the use of such opposed rotating cones, objects of varying lengths can be rotated identically and the exact angle of rotation can be adjusted by adjusting the lateral position of the entry of the object into the nip of the cones or by changing the angle of the cones. That is, the closer the object is to the large end of the cones, or the smaller the cone angle, the lesser the angle of rotation that will be obtained. By providing for interchangeable cones, or providing a series of opposed cones, any desired angle of rotation may be selected including rotation in a first direction for a certain series of steps and then rotation in a reverse direction for additional steps.

The positive control of the article is provided by a pair of opposed rotating members which may be, for example, in the form of parallel belt type conveyors or sets of opposed rollers. A pair of such rotating members is provided both preceding and following the turning cones and each pair of opposed rotatable members have an adjustable mechanism which permits precisely timed engagement and disengagement of the article such that the article is positively grasped between the opposed rotating members until it is just captured in the nip between the rotating cones at which time it is released from the infeed opposed rotating members. The opposed outfeed rotating members permit the article to pass therebetween without positive gripping until precisely the moment when the article is released from the nip of the turning cones. At that time, positive gripping occurs between the opposed outfeed rollers to carry the article away in a precise orientation. Both the infeed opposed rotating members and outfeed opposed rotating members have an adjustable mechanism to permit a precise timing of the gripping and releasing to accommodate varied lengths and widths of the article which is rotated. Such adjustable mechanisms may include cams carried on one of the rotating members to move the rotating members toward and away from each other, linkages carried by such rotating members or sectored surfaces of opposed roller pairs.

BRIEF DESCRIPTION OF THE DRAWINGS

FIG. 3 is a side view taken generally along the lines III—III of FIG. 1.

FIG. 6 is a side view of a further alternative embodiment of the present invention.

FIG. 7 is a side view of a further alternative embodiment of the present invention.

FIG. 12 is a partial side elevational view of an alternative embodiment of the opposed rotating members comprising a mechanical linkage as the gripping and releasing mechanism.

FIG. 13 is a side elevational view of the embodiment of FIG. 12 showing the opposed rotating members in a released position.

FIG. 14 is a side elevational view of an alternative embodiment of the opposed rotating members illustrating the use of sectored cams as the gripping and releasing mechanism and illustrating an article moving out of a nip of the rotating cones.

FIG. 15 is a side elevational view of the device of FIG. 14 illustrating a article moving toward the rotating cones.

FIG. 16 is a side elevational view of the device of FIG. 14 illustrating an article moving into the nip of the rotating cones.

DESCRIPTION OF THE PREFERRED EMBODIMENTS

The present invention finds particular utility in an application where a relatively flat item such as a partially formed bag is to be rotated in a horizontal plane as it is longitudinally moving in that plane, although the present invention could be used for rotating any type of object, preferably having opposed flat surfaces for engagement by the rotating members which impart rotary motion to the item. Since the invention does have this particular utility in rotating bag material during bag formation, the invention will be disclosed in such an environment, however it should be understood that it is not intended that the invention be limited to such an environment.

Figure 1:
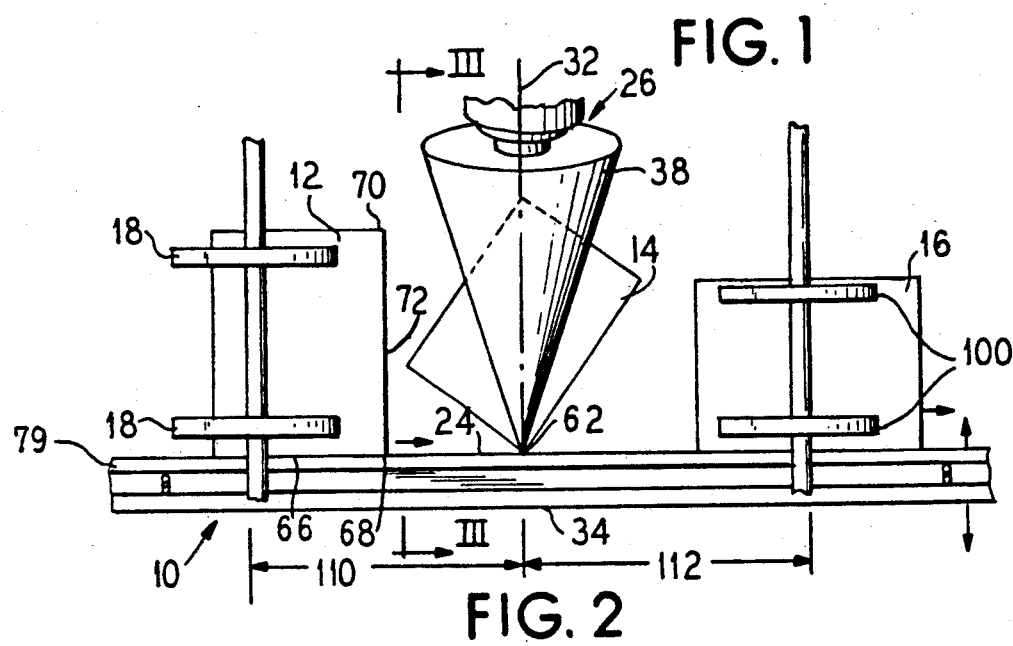
FIG. 1 is a plan view of a bag turning device incorporating the principles of the present invention.

In FIG. 1 there is a plan view of a conveyor line shown generally at 10 in which three separate partially formed bags 12, 14, 16 are illustrated in various rotational orientations. The first bag 12 is positioned between rotating conveying rollers 18, 20 forming a horizontal nip 22 therebetween which cause the bag 12 to be conveyed in a horizontal longitudinal direction signified by arrow 24. A device for rotating the bag in a horizontal plane is illustrated at 26 in FIGS. 1 and 2 as being a pair of cone shaped rollers 28, 30 positioned one above the other, each having an axis of rotation perpendicular to the longitudinal direction of movement 24 of the bag 12. Narrow ends 34, 36 of the cone rollers overlie one another as do wide ends 38, 40 and, as best seen in FIG. 3, the cone roller axes 32, 33 are positioned at an angle $\alpha$ which is one half of an angle $\beta$ of the cone so that a nip 42 between the cones 28, 30 is horizontal.

Figure 2:
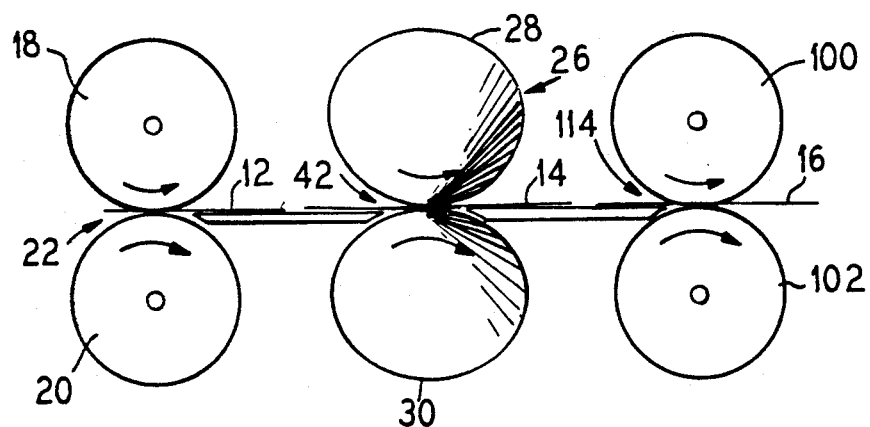
FIG. 2 is a side view of the device of FIG. 1.

In a preferred embodiment, shown in FIGS. 1-3, the cone rollers have a solid continuous outer surface which may be formed of an elastomeric material so as to be somewhat compressible and also so as to enhance the frictional characteristics of the surface. The cone rollers are supported in cantilevered fashion on axles 44, 46 each axle being carried in a bearing 48, 50 which is in turn secured to a part of a frame 52 of the conveyor 10. At least one of the cone rollers 28 is rotationally driven by means of a drive shaft 54 powered by a motive source (not shown) and connected by a linking shaft 56 through a gear connection 58, 60 to the axle 44. Alternatively, a motor may be connected directly to the shaft 44 to directly drive the cone roller 28 or both cone rollers 28, 30 may be driven, so long as they are rotated at the same speed.

As the bag 12 enters the nip 42 between the cone shaped rollers, the bag is caused to rotate about a point 62 representing the vertex or tip of the cones. This rotation is caused by a differential in the linear surface speeds along the axial length of the roller axes 32, 33. That is, at the vertex 62, the linear speed is zero since it is this point about which the roller is rotating. However, at the wide end 38, the speed is at a maximum since the circumferential length of the roller is greatest at that point. The exact angle of rotation of the bag is governed by two factors. The first factor is the angle $\beta$ of the roller. The second factor is the location of a longitudinal edge 66 of the bag relative to the vertex 62.

The maximum angle through which the item will be rotated by the cone shaped rollers occurs when the edge 66 is aligned with the vertex 62 which will cause a corner 68 of the bag to become a pivot point resulting in the rest of the bag rotating about that point between the rollers. In that situation, the corner 68 is held virtually stationary while the opposite side of the bag is subjected to the maximum linear speed of the roller.

Figure 4:
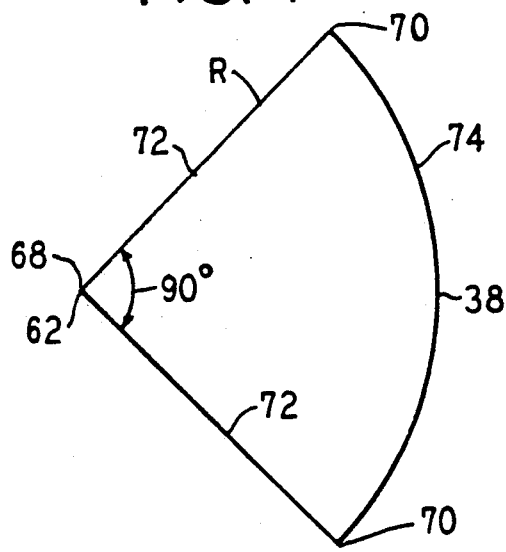
FIG. 4 is a schematic representation of the rotation of an item as well as a surface projection of a cone.

For example, if it is desired to rotate the bag by 90°, the corner 68 will be held relatively fixed when edge 66 is aligned with the vertex 62 and it will be necessary for corner 70 to rotate through a 90° angle. This type of movement is shown schematically in FIG. 4 in which there is shown a quarter circle in which the vertex can represent the point 68 and the linear sides can represent an edge 72 of the bag which connects corners 69 and 70. The end points of an arc side 74 of the quarter circle can represent the corner 70 in the original and rotated positions. In order to achieve such a rotation, this flat quarter circle shape can be transformed into a cone shape by laying the two linear sides 72 on top of one another and causing the arc side 74 to form a circle. In doing so a cone will be formed in which the corner 68 will be equivalent to vertex 62 of FIG. 3 and the arc shape 74 will be equivalent to the wide end 38, with the cone having an angle $\beta$. A length of the cone along the surface (edge 72) is designated R. Since the angle of the quarter circle at the corner 68 is known to be 90°, that is, the angle of desired rotation is 90°, it is known that the length of the arc line 74, as expressed in radians, is $2\pi R/4$ or $\pi R/2$. The angle $\beta$ can be determined through trigonometry knowing that the length of the circle represented by the wide end 38, having a diameter D is $\pi D$ which, is equated to the length already known as $\pi R/2$. Thus, $D = R/2$.

To determine the angle $\beta$ it is known that since this is a right circular cone, the $\sin(\beta)/(2) = D/2R$. Since $D = R/2$, $\beta = 2\sin^{-1}(\frac{1}{4})$. Upon consulting a trig table, it can be determined that $\beta = 28.955°$. Thus, if a bag is directed into the nip of two cones, the cones each having an angle of 28.955°, and the edge 66 of the bag being aligned with the vertex 62 of the cones, a 90° rotation of the bag will result.

Moving the edge 66 of the bag away from the vertex 62 of the cone rollers, towards the wide end 38, will result in a lesser angle of rotation of the bag. This occurs in that the corner 68 of the bag will no longer be held stationary, but will in fact be rotated through an arc between the rollers. Thus, the angle of rotation can be decreased by laterally adjusting the relative positions of the cone rollers with respect to the bags which can be accomplished either by providing a lateral mounting arrangement for the rollers such as slotted brackets 76 (FIG. 2) and by providing a telescoping spline connection 78 as part of the drive shaft 54 which would permit lateral movement of the rollers. Alternatively an edge guide 79 (FIG. 1) may be provided for guiding the bags which would abut with edge 66 of the bags and which would be laterally adjustable. In either instance, the relative lateral position of the bags and the cone rollers can be adjusted to selectively increase or decrease the precise angle of rotation.

By changing the angle $\beta$ of the cone rollers, the amount of rotation achieved will also be changed. Thus, by making the angle slightly greater than 28.955°, that is approximately 30°, and by moving the edge 66 slightly away from the vertex 34, an exact rotation of 90° can be achieved without requiring a precise construction of the cone. To achieve a lesser rotation, the angle $\beta$ of the cone can be decreased below 30° or the edge of the bag can be moved further from the vertex. Thus, for any desired angle of rotation (equal to or less than 90°, as explained below), a cone shape can be generated which will result in a desired angle of rotation.

The nip 42 between the two cones forms a lateral line of contact with the item being rotated and the rotation of the cone roller thus applies different linear speeds to different lateral portions of the bag. Due to the line contact between the rollers and the item, the linear movement applied to the item is always applied in the longitudinal direction and it is the difference in speed at the different lateral portions of the item which causes the rotation.

Figure 5:
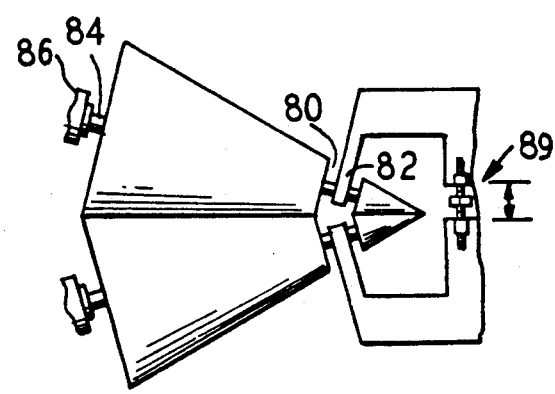
FIG. 5 is a side view of an alternative embodiment of the present invention.

FIG. 5 shows an alternative embodiment of the cone shape rollers in which the rollers are supported at both ends as opposed to being cantilevered. In this manner, the cone surface may be discontinuous as at 80 to permit a second bearing 82 to engage a cone carrying shaft 84 in addition to a bearing 86 at the large end of the cone. The second bearing 82 could also be positioned at the vertex of the cone, with the cone being truncated. In order to achieve a 90° rotation of the item, the angle of the cone rollers would have to be increased beyond 30° if the edge of the item is laterally spaced from the point representing the vertex of the cone.

Again in this arrangement the contact between the cone rollers and the item being rotated is along a lateral line, although in this instance it is two segments of the line with a space between the two segments. Again, however, different linear speeds are applied to laterally spaced portions of the item, those linear speeds being applied in the longitudinal direction.

Also illustrated in FIG. 5 is a vertical adjustment device shown schematically at 89 which may comprise a threaded connection in the support structure holding the two rollers. It would be advantageous in all of the embodiments of the invention to provide vertical adjustability between the roller pairs in order to provide for varying thicknesses of the material passing between the rollers as well as for adjusting the gripping of the rollers on the items.

FIG. 6 illustrates a further embodiment of the invention in which a spaced pair of rollers 90, 92 having different diameters are positioned such as to form the phantom shape of a cone as indicated at 94. The rollers 90, 92 are to be rotated at the same rotational rate thus resulting in different linear speeds of the two roller surfaces. The angle of rotation of the item can be adjusted by adjusting the spacing of the two rollers 90, 92 thus changing the phantom shape 94 of the cone.

By using two spaced rollers (or any number of rollers greater than 2), contact between the rollers and the item rotated is more on the order of discrete points of contact rather than a line of contact. However, the same effect is achieved in that laterally spaced portions of the item to be rotated are moved at different linear speeds in the longitudinal direction.

FIG. 7 illustrates yet a further alternative embodiment of the invention in which two rollers 96, 98 having identical diameters are provided, however each of the rollers are rotated at a different rate such that a linear surface velocity produced by each roller is different and the linear velocity, as schematically indicated above the rollers, forms a triangular shape similar to the side view of the cone. With an arrangement such as that shown in FIG. 7, the angle of rotation of the item being directed between the rollers can be adjusted by adjusting the relative speeds of the two rollers or by adjusting the distance between the two rollers.

Again, the same effect is accomplished through this alternative embodiment in that laterally spaced portions of the item are moved at different linear speeds in the longitudinal direction due to the point-like roller contact between the rollers and the item being rotated. The linear velocities of the roller surfaces in this embodiment wherein the roller diameters are identical could be identical to the linear speeds of the roller surfaces in the embodiment of FIG. 6 and thus a velocity profile such as illustrated schematically in FIG. 7 would be identical to such a velocity profile if graphed for the embodiment of FIG. 6 as well as the embodiments of FIGS. 1-5.

With the embodiments such as shown in FIGS. 6 and 7, items having a different shape than a completely planar top surface may also be rotated. For example, an item having a stepped top surface in which the top surface has two or more different heights, one height being engaged by a first of the rollers and a second height being engaged by a second of the rollers, could be so rotated so long as the surfaces themselves at each height are planar and parallel to the plane in which the item is to be rotated. By making the individual rollers vertically adjustable in height, such varying shapes could easily be accommodated.

Because of the use of rollers to effect the rotation in the configurations described, rotation of the item is limited to a maximum of 90°. After a 90° rotation, the item will be discharged from the nip of the rollers and thus can no longer be rotated. After discharge, the item is engaged by further transfer rollers 100, 102 to move the item away from the rotation device 76. Thus, if rotation greater than 90° is desired, a second rotation device or pair of rotation imposing rollers could be utilized following the first set of rollers to provide the additional rotation. Further, if the item is to be rotated in a first direction for a certain operation and then returned back to its original position, oppositely directed rollers could be utilized to provide a rotation in a first direction and then subsequently in an opposite direction.

Referring back to FIG. 1, there are certain dimensional requirements relating to the positioning of the conveying rollers 18, 20 with respect to the bag turning device 26 as indicated by dimension 110. It is necessary that dimension 110 be equal to or greater than the length of side 66 of bag 12. This is necessary so that the bag 12 will be released from rollers 18, 20 no later than the point in time at which the forward edge 72 is engaged in the nip 42 of rollers 28, 30. If positive control of the bag 12 is to be maintained, the dimension 110 would have to be exactly equal to the length of side 66. Similarly, the dimension 112 between the nip 42 of rollers 28, 30 and a nip 114 of rollers 100, 102 must be at least equal to or greater than a length of side 72 of the bag so that the bag is released from nip 42 no later than engagement with nip 114. Again, if positive control is to be maintained, the dimension 112 must be equal to the lateral length of side 72.

Although each of the embodiments is shown as having vertically opposed cones as providing the rotation, only a single cone (or cone pair) is actually required if that roller forms a nip with a surface that permits the item to be rotated such as a ball bearing table or some such "frictionless" surface.

FIGS. 8-16 illustrate various alternative embodiments of opposed rotating members serving to positively control the bag or other item as it is carried toward and fed into the nip 42 between the cones 28, 30 and as it is released from that nip. Of course, the arrangement illustrated in FIGS. 1-7 could be utilized to provide the positive control, even with varying lengths and widths of the items to be rotated by providing an adjusting mechanism which changes the longitudinal position of the opposed rollers 18, 20 and 100, 102.

Figure 8:
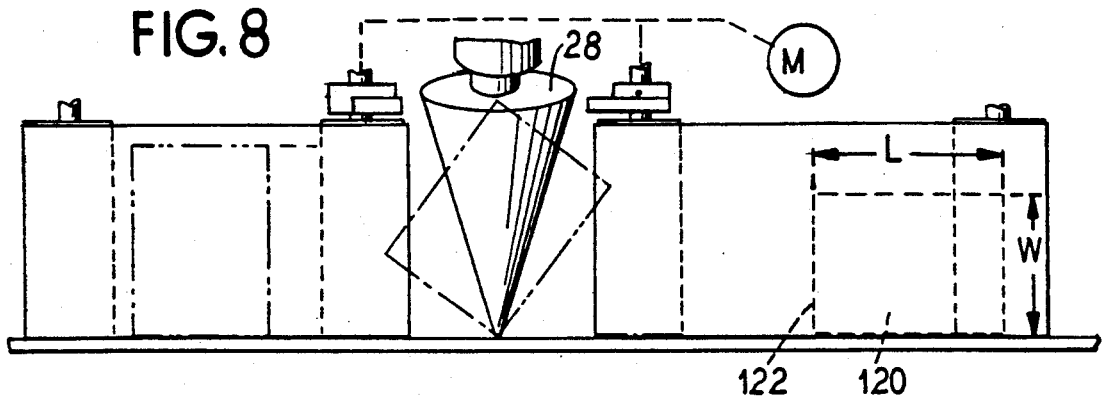
FIG. 8 is a plan view of the bag turning device and including the positive control infeed and outfeed conveyors.

As seen in FIG. 8, as a bag 120 is moved toward the cones 28, 30, the bag will present a forward edge 122 to the cone nip 42. Upstream of the cones 28, 30 it is important to positively control the bag 120, which control is achieved by carrying the bag between a pair of opposed rotating members 124, 126 which, in the embodiment shown in FIGS. 8-13 are in the form of opposed belt-type conveyors. The conveyors have a continuous belt member 128, 130 which is carried on a pair of spaced rollers 132, 134 and 136, 138 such that the belts remain taut. One roller 134, 138 of each pair is driven and the other roller 132, 136 merely idles. The driven rollers 134, 138 are each carried on a shaft, one of which carries a cam 144 and the other of which carries a wheel 146 which aligns with the cam 144. The cam 144 is rotationally adjustable on the shaft 140 such that an extending lobe 150 of the cam will selectively engage the surface of the wheel 146 to move the rollers 134, 138 relative to one another. Thus, as the bag 120 engages the nip 42, as shown in FIG. 10, the cam lobe 150 will engage the wheel 146 and will cause the roller 134 to move away from the roller 138 thereby to release the gripping of the bag 120 by the opposed conveyors 124, 126. It is also important that the distance 152 (FIG. 10) between the nip 42 of the rotating cones 28, 30 and the end of the nip between conveyor belts 128, 130 be at least as long as a longitudinal length L of the bag. This will ensure positive gripping of a bag during the entire time and up to it is captured by the nip 42 of the rotating cones 28, 30. Of course, the distance 152 may be less than the length L of the bag in which case the lobe 150 of cam 144 will cause the rollers 134, 138 to move apart, thus releasing the nip between the belts 128, 130 and thus releasing the bag 120 and leaving it free to rotate by means of the rotating cones 28, 30. By changing the angular position of the cam 144 on the shaft 140, precise timing of the release of the conveyor nip between belts 128 and 130 can be adjusted and maintained.

Figure 9:
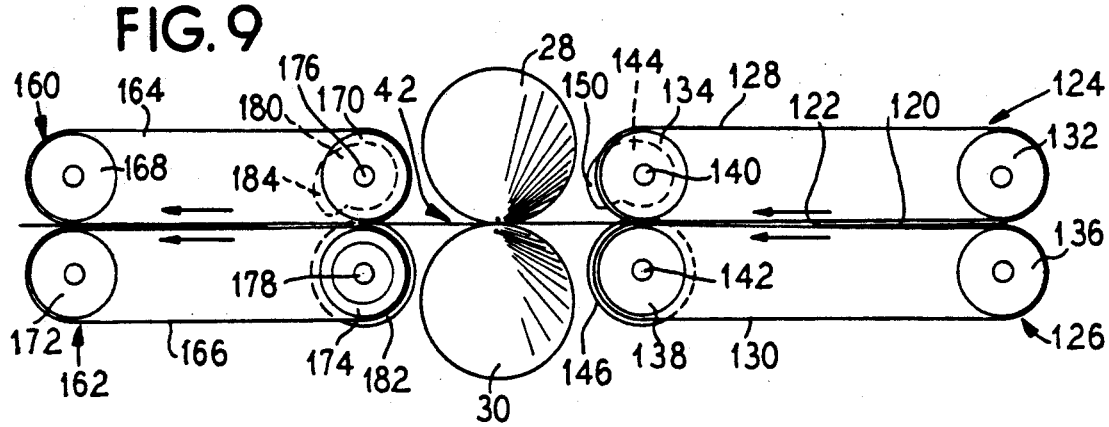
FIG. 9 is a side elevational view of the bag turning device of FIG. 8 utilizing cams as the gripping and releasing mechanism.
Figure 10:
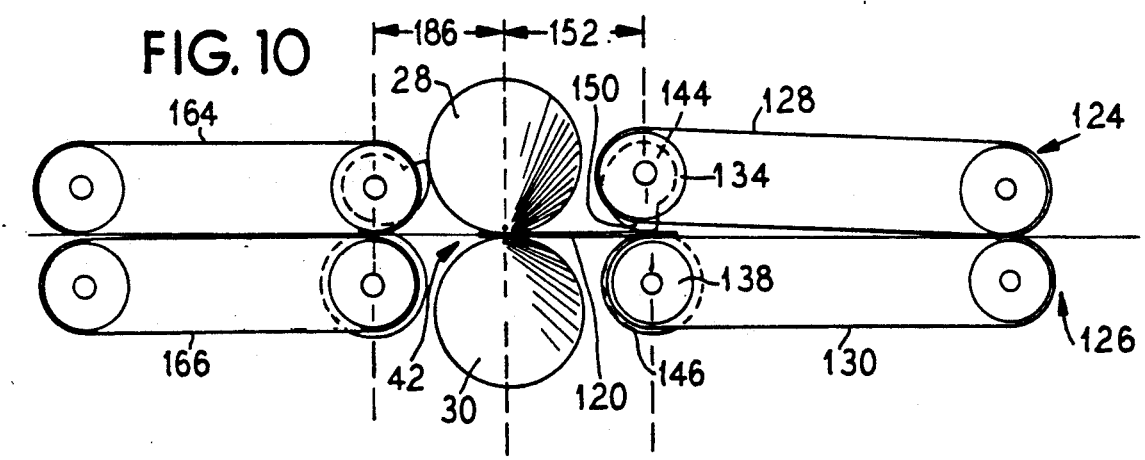
FIG. 10 is a side elevational view of the device of FIG. 9 showing an article moving into the nip of the rotating cones.
Figure 11:
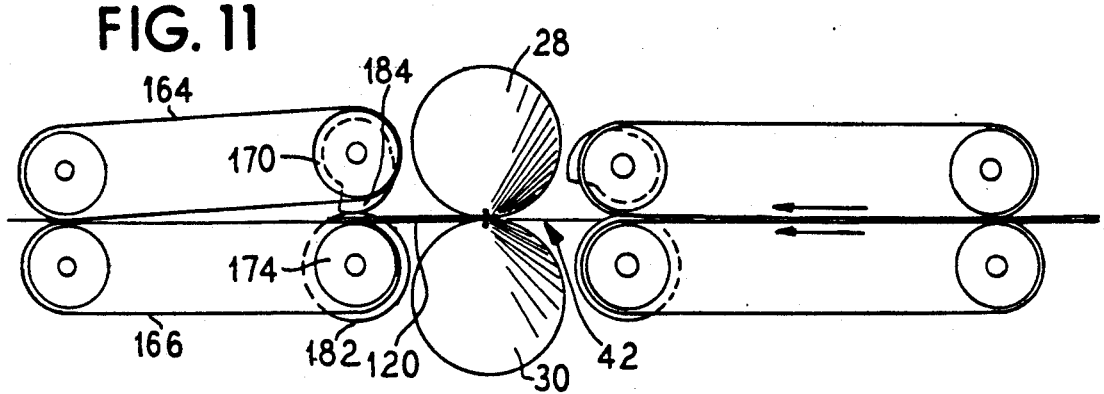
FIG. 11 is a side elevational view of the device of FIG. 9 showing an article moving out of the nip of the rotating cones.

A substantially identical arrangement is provided on the outfeed or downstream side of the rotating cones 28, 30 in the form of a pair of opposed rotating members 160, 162 which, in the embodiment illustrated in FIGS. 9-13, also comprise opposed belt type conveyors in which a belt 164, 166 is carried on two spaced rollers 168, 170 and 172, 174. Again, one roller 170, 174 of the pair is driven while the other roller 168, 172 of the pair is an idler. Also, the two driven rollers 170, 174 are each carried on a drive shaft 176, 178 and one of the drive shafts carries a cam 180 while the other drive shaft carries a wheel 182. Again, the cam 180 has a lobe 184 which engages with the wheel 182 at select times in accordance with the adjustable angular orientation of the cam 180 on the shaft 176. Thus, when the bag 120 is still maintained in the nip 42 between the rotating cones 28, 30 (FIG. 11) the lobe 184 will be in engagement with the wheel 182 such that the rollers 170, 174 are held apart thus permitting the bag to move unhindered into the space between the opposed belts 164, 166. However, as soon as the bag 120 is released from the nip 42 between the cones 28, 30, the lobe 184 will disengage from the wheel 182 such that the rollers 170, 174 will move together to provide an engaging nip between the opposed belts 164, 166 to positively grasp and control the bag and move it away from the rotating cones as seen in FIG. 9. Again, it is important that a spacing 186 between the nip 42 of the rotating cones 28, 30 and the nip between the opposed rollers 164, 166 is no greater than a lateral width W (FIG. 8) of the bag 120 to assure that a positive grasping of the bag 120 will occur immediately upon the release of the bag from the rotating cones 28, 30. Of course, the distance 186 can be substantially less than the width of the bag in which event the cam lobe 184 will assure that the bag material will be able to move freely between the opposed belts 164, 166 up until precisely the time at which the bag is released from the nip 42 between the rotating cones 28, 30, at which time it will be positively grasped by the opposed belts 164, 166.

FIGS. 12 and 13 illustrate an alternative embodiment of the adjustable timing mechanism for moving the opposed rotating members toward and away from one another which comprises a linkage mechanism 190. Specifically, drive shaft 140 carries a crank arm 192 to which a link member 194 is pivotally attached at 196. The drive shaft 142 carries a second crank 198 which has a pivot pin 200 carried thereon. The pivot pin 200 is received in a slot 202 on the link 194. In the orientation of the cranks 192, 198 as shown in FIG. 12, the rollers 134 and 138 will be pressed together (by biasing means not shown) thus forming an engaging nip between the opposed belts 128, 130. However, as the cranks are rotated to the position as illustrated in FIG. 13, the pivot pin 200 will move within the slot 202 thus causing the belts 128, 130 to move away from each other to thereby release the positive gripping engagement on the bag 120 as it is engaged in the nip 42 between the rotating cones 28, 30. The pivot pin 200 thus presses against the end of the slot 202 to press the link 194 upward to move the upper roller 134 away from the lower roller 138. Again by adjusting the angular orientation of the cranks 192, 198 on the drive shafts 140, 142 the timing of the release and gripping between the opposed belts 128, 130 can be controlled with precision.

FIGS. 14-16 illustrate an alternative embodiment of the opposed rotating members to be used for the infeed and outfeed of the bag. In this embodiment, opposed rotating members 210, 212 comprise a series of spaced rollers, at least one of which has a sectored surface which can be utilized to precisely control the grasping and releasing effect between the opposed rotating members. In FIG. 14 there is illustrated a flat article 214 which is just about to move out of the nip 42 between the opposed rotating cones 28, 30. A pair of opposed rollers 216, 218 are the first of a series of opposed rollers in the outfeed station and one roller 216 has a sectored outer surface 220 and has been angularly oriented such that the large radiused surface 220 will begin to engage with the opposed roller 218 at precisely the moment when the article 214 is released from the nip 42. The surface 220 will remain in engagement with the opposed roller 218 until the article 214 is engaged by a second pair of opposed rollers 222, 224, one of which may also have a sectored surface. In this manner, the article 214 is positively controlled at each portion of its travel, that is, both while it is being rotated and as soon as it is released from the rotating cones.

Similarly, opposed rotating members are provided at the infeed station such that positive control of a article 230 occurs between opposed rollers 232, 234 and rollers 236, 238 as the article 230 is moved toward the rotating cones 28, 30. A final pair of opposed rollers 240, 242 are positioned such relative to the rotating cones 28, 30 and, a sectored one 240 of the rollers is angularly oriented such that a large radial surface 244 will terminate precisely at the time when the article 230 is engaged by the nip 42 between the opposed rollers 28, 30 as illustrated in FIG. 16. Thus, positive control of the article 230 between opposed rotating members is assured during the entire time that the article is moving toward the rotating cones 28, 30 and release of the article does not occur until precisely the moment when the article is engaged by the nip between the rotating cones.

Again a spacing relationship between the various opposed roller pairs is critical. A space 250 between the nip 42 of the rotating cones 28, 30 and a nip of the last infeed roller pair 240, 242 as well as the spacings 252, 254 between each set of infeed opposed roller pairs must be no less than the longitudinal length L of the article being rotated. Of course, the spacing can be substantially less than the length L in which event the reduced radius of portions of the roller surface will be effective to release the grasp on the article when the article is being grasped by a different opposed roller pair. A space 256 between the nip 42 of the rotating cones 28, 30 and a nip of the first of the outfeed opposed rollers 216, 218 as well as the spacing 258 between adjacent outfeed rollers must be no greater than the lateral width W of the rotated article to assure that positive control of the article will always be maintained. Again, of course, the spacing can be less than the width W in which event the reduced radiused a portion of the sectored roller will permit release of the article by one pair of opposed rollers when the article has been grasped by another pair of opposed rollers.

Thus it is seen that the present invention provides a method and apparatus for rotating an item through an angle in a plane by applying different linear speeds to different laterally spaced portions of the item. Preferably this rotation is provided by means of a pair of cone shape rollers providing a nip into which the item is drawn, with the cone shape of the rollers providing the varying linear speeds. Alternatively, the rollers may be discrete portions of a cone including two spaced rollers comprising the phantom shape of a cone or two rollers having identical diameters with varying speeds of rotation to result in different linear surface speeds of the rollers to be applied at differing portions of the item to effect the rotation.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A device for rotating an item in a plane through an angle wherein said item is being conveyed in a linear longitudinal direction in said plane comprising:
   opposed and continuously rotating members for positively controlling said item as it is being conveyed in said linear longitudinal direction;
   means for engaging a first portion of said item and for moving said portion at a first linear speed in said longitudinal direction;
   means for simultaneously engaging a second, laterally spaced portion of said item and for moving said laterally spaced portion at a second, different linear speed in said longitudinal direction;
   means for releasing said positive control of said opposed rotating members when said item is engaged by said means for engaging; and
   a mechanically adjustable mechanism to provide positive controlling and release of said item at preselected times by said continuously rotating members.

2. A device according to claim 1, wherein said means for engaging a first portion of said item comprises a first portion of a rotating roller means and said means for engaging a second portion of said item comprises a second portion of said roller means, said first roller means portion and said second roller means portion having different linear surface speeds as said roller means is rotated.

3. A device according to claim 2, wherein said roller means comprises a cone shaped roller, a narrow portion of said cone shape having a different linear surface speed than a wider portion.

4. A device according to claim 2, wherein said first portion of said roller means comprises a first roller and said second portion of said roller means comprises a second, laterally spaced roller, said first and second rollers having different linear surface speeds.

5. A device according to claim 4, wherein said rollers have different diameters, but are rotated at the same speed.

6. A device according to claim 4, wherein said rollers have the same diameter, but are rotated at different speeds.

7. A device according to claim 2, wherein said roller means is adjustable perpendicular to the plane of rotation to adjust the force of engagement between the roller and the item.

8. A device according to claim 2, wherein said roller means has a compressible outer surface for engagement with said item.

9. A device according to claim 2, wherein said roller means has a friction enhancing outer surface.

10. A device according to claim 2, including means for adjusting the lateral relationship between said item and said roller means prior to engagement between said roller means and said item.

11. A device according to claim 10, wherein said roller means is laterally adjustable.

12. A device according to claim 10, wherein said item is longitudinally guided by a longitudinal guide means and said guide means is laterally adjustable.

13. A device according to claim 1, wherein a parallel set of said opposed rotating members is provided at each longitudinal side of said means for engaging such that said item will be positively controlled both before and after said item is rotated.

14. A device according to claim 13, wherein said set of opposed rotating members which is positioned longitudinally upstream of said means for engaging is spaced from said means for engaging no less than a longitudinal length of said item.

15. A device according to claim 13, wherein said set of opposed rotating members which is positioned longitudinally downstream of said means for engaging is spaced from said means for engaging no less than a lateral width of said item.

16. A device according to claim 1, wherein said rotating members are opposed vertically.

17. A device according to claim 1, wherein said adjustable mechanism causes said opposed rotating members to move toward and away from each other.

18. A device according to claim 17, wherein said mechanism comprises a cam carried on one of said rotating members to periodically urge said members apart.

19. A device according to claim 17, wherein said mechanism comprises a linkage between said rotating members to periodically urge said members apart.

20. A device according to claim 17, wherein said mechanism comprises a varying radiused surface on at least one of said opposed rotating members to cause periodic engagement and disengagement between said members, said at least one rotating member being positionable in selected longitudinal locations to vary the time said at least one rotating members positively controls and releases said item.

21. A device according to claim 1, wherein said opposed rotating members comprise opposed belt conveyors.

22. A device according to claim 1, wherein said opposed rotating members comprise opposed sets of rollers.

23. A method of conveying an item in a linear longitudinal direction and rotating said item through an angle in a plane as said item is being conveyed in said linear longitudinal direction in said plane comprising:
    positively controlling said item with opposed continuously rotating members as said item is conveyed in said longitudinal direction, before and after rotation of said item;
    moving a first portion of said item at a first linear speed in said longitudinal direction;
    simultaneously moving a second, laterally spaced portion of said item at a second, different linear speed in said longitudinal direction to effect rotation of said item;
    releasing said positive control of said item by said opposed rotating members immediately upon commencement of rotation of said item and reengaging said positive control immediately upon termination of rotation of said item; and
    mechanically adjusting said opposed continuously rotating member to provide positive controlling and release of said item at preselected times.

* * * * *